United States Patent

Yoshida et al.

(10) Patent No.: US 9,663,046 B2
(45) Date of Patent: May 30, 2017

(54) ELECTRIC WIRE AND WIRE HARNESS

(71) Applicant: YAZAKI CORPORATION, Tokyo (JP)

(72) Inventors: Hiroyuki Yoshida, Shizuoka (JP); Hideomi Adachi, Shizuoka (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/213,760

(22) Filed: Jul. 19, 2016

(65) Prior Publication Data
US 2016/0325699 A1 Nov. 10, 2016

Related U.S. Application Data

(63) Continuation of application No. PCT/JP2015/051710, filed on Jan. 22, 2015.

(30) Foreign Application Priority Data

Feb. 21, 2014 (JP) .................. 2014-031307

(51) Int. Cl.
*B60R 16/02* (2006.01)
*H01B 7/24* (2006.01)
*H01B 7/18* (2006.01)
*H02G 3/04* (2006.01)
*B60K 6/22* (2007.10)

(52) U.S. Cl.
CPC ............ *B60R 16/0215* (2013.01); *B60K 6/22* (2013.01); *H01B 7/184* (2013.01); *H01B 7/24* (2013.01); *H02G 3/0481* (2013.01)

(58) Field of Classification Search
CPC .... B60R 16/0215; B60K 6/22; H02G 3/0481; H01B 7/24; H01B 7/184

USPC ...................................................... 174/102 R
See application file for complete search history.

(56) References Cited

U.S. PATENT DOCUMENTS

| | | | | |
|---|---|---|---|---|
| 3,170,160 A | * | 2/1965 | Burniston | B65D 69/00 174/159 |
| 9,213,145 B2 | * | 12/2015 | Droesbeke | G02B 6/4478 |
| 2009/0283293 A1 | * | 11/2009 | Hiner | H01R 4/22 174/87 |
| 2011/0110635 A1 | * | 5/2011 | Toge | G02B 6/4403 385/102 |
| 2011/0132638 A1 | | 6/2011 | Oga et al. | |

FOREIGN PATENT DOCUMENTS

| | | | |
|---|---|---|---|
| CN | 203242378 | * | 10/2013 |
| JP | 2010-051042 A | | 3/2010 |
| JP | 2012-129141 A | | 7/2012 |
| WO | 2014/017548 A1 | | 1/2014 |

OTHER PUBLICATIONS

International Search Report of PCT/JP2015/051710 dated Apr. 21, 2015.

* cited by examiner

*Primary Examiner* — Timothy Thompson
*Assistant Examiner* — Charles Pizzuto
(74) *Attorney, Agent, or Firm* — Sughrue Mion, PLLC

(57) ABSTRACT

An electric wire and a wire harness include a linear conductor, and a covering member configured to include a covering main body that covers an outer circumferential side of the conductor, and a rib portion that is formed integrally with the covering main body, as a protrusion, on an outer circumferential surface of the covering main body.

17 Claims, 5 Drawing Sheets

ELECTRIC WIRE AND WIRE HARNESS

CROSS-REFERENCE TO RELATED APPLICATION

This application is a continuation application of International Application PCT/JP2015/051710, filed on Jan. 22, 2015, and designating the U.S., the entire contents of which are incorporated herein by reference.

BACKGROUND OF THE INVENTION

1. Field of the Invention

The present invention relates to an electric wire and a wire harness.

2. Description of the Related Art

As an electric wire and a wire harness conventionally used, for example, those used for electrically connecting high-voltage devices mounted on a hybrid vehicle or an electric vehicle are known. As such an electric wire and a wire harness, for example, Japanese Patent Application Laid-open No. 2010-51042 discloses a wire harness configured to include a plurality of conductive paths, a resin corrugated tube which collectively receives the plurality of conductive paths, and a resin protector. The corrugated tube is formed into a flexible bellows tube, and a plurality of the corrugated tubes is arranged in a longitudinal direction of the wire harness. The protector is provided at a portion which needs route regulation. In addition, the protector is provided at a position where adjacent corrugated tubes are connected. The corrugated tube and the protector are used as a packaging member.

Regarding the wire harness described in Japanese Patent Application Laid-open No. 2010-51042, for example, there may be a case where a post-fitted packaging member is necessary in order to regulate a route, and thereby working man hours increase. Therefore, the wire harness has room for improvement in workability during wiring arrangement.

SUMMARY OF THE INVENTION

The present invention has been made in view of the above situation, and an object thereof is to provide an electric wire and a wire harness capable of improving workability during wiring arrangement.

In order to achieve the above mentioned object, an electric wire according to one aspect of the present invention includes a linear conductor; and a covering member configured to include a covering main body that covers an outer circumferential side of the conductor, and a rib portion that is formed integrally with the covering main body, as a protrusion, on an outer circumferential surface of the covering main body, wherein the covering member includes a straight portion in which the rib portion is formed along an extending direction of the conductor, and a bent portion that is provided beside the straight portion along the extending direction of the conductor and in which the rib portion is less dense than that in the straight portion, and the bent portion is provided with the rib portion.

In order to achieve the above mentioned object, an electric wire according to another aspect of the present invention includes a linear conductor; and a covering member configured to include a covering main body that covers an outer circumferential side of the conductor, and a rib portion that is formed integrally with the covering main body, as a protrusion, on an outer circumferential surface of the covering main body, wherein the covering member includes a bent outer part in which the rib portion is formed and a bent inner part that is provided beside the bent outer part along a circumferential direction of the covering main body and in which the rib portion is less dense than that in the bent outer part.

According to still another aspect of the present invention, in the electric wire, it is possible to configure that the covering member includes sites having different density of the rib portion from each other in the extending direction of the conductor.

According to still another aspect of the present invention, in the electric wire, it is possible to configure that the covering member includes sites having different density of the rib portion from each other in the circumferential direction of the covering main body.

According to still another aspect of the present invention, in the electric wire, it is possible to configure that the covering member is a sheath that covers an outer circumferential side of an insulated wire obtained by covering the conductor with an insulator.

According to still another aspect of the present invention, in the electric wire, it is possible to configure that the covering member is an insulator that covers the outer circumferential side of the conductor.

In order to achieve the above mentioned object, a wire harness according to still another aspect of the present invention includes an electric wire that includes a linear conductor, and a covering member configured to include a covering main body that covers an outer circumferential side of the conductor, and a rib portion that is formed integrally with the covering main body, as a protrusion, on an outer circumferential surface of the covering main body; and a connecting unit provided at an end portion of the electric wire, wherein the covering member includes a straight portion in which the rib portion is formed along an extending direction of the conductor, and a bent portion that is provided beside the straight portion along the extending direction of the conductor and in which the rib portion is less dense than that in the straight portion, the straight portion constitutes a linear conductive path, and the bent portion constitutes a bent conductive path provided with the rib portion.

In order to achieve the above mentioned object, a wire harness according to still another aspect of the present invention includes an electric wire that includes a linear conductor, and a covering member configured to include a covering main body that covers an outer circumferential side of the conductor, and a rib portion that is formed integrally with the covering main body, as a protrusion, on an outer circumferential surface of the covering main body; and a connecting unit provided at an end portion of the electric wire, wherein the covering member includes a bent outer part in which the rib portion is formed and a bent inner part that is provided beside the bent outer part along a circumferential direction of the covering main body and in which the rib portion is less dense than that in the bent outer part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinbelow, embodiments of the present invention will be described in detail based on the drawings. The present invention is not limited by the embodiments. Constitutional elements of the following embodiments include those which can be substituted by a person skilled in the art easily, or those substantially the same.

First Embodiment

Figure 1:
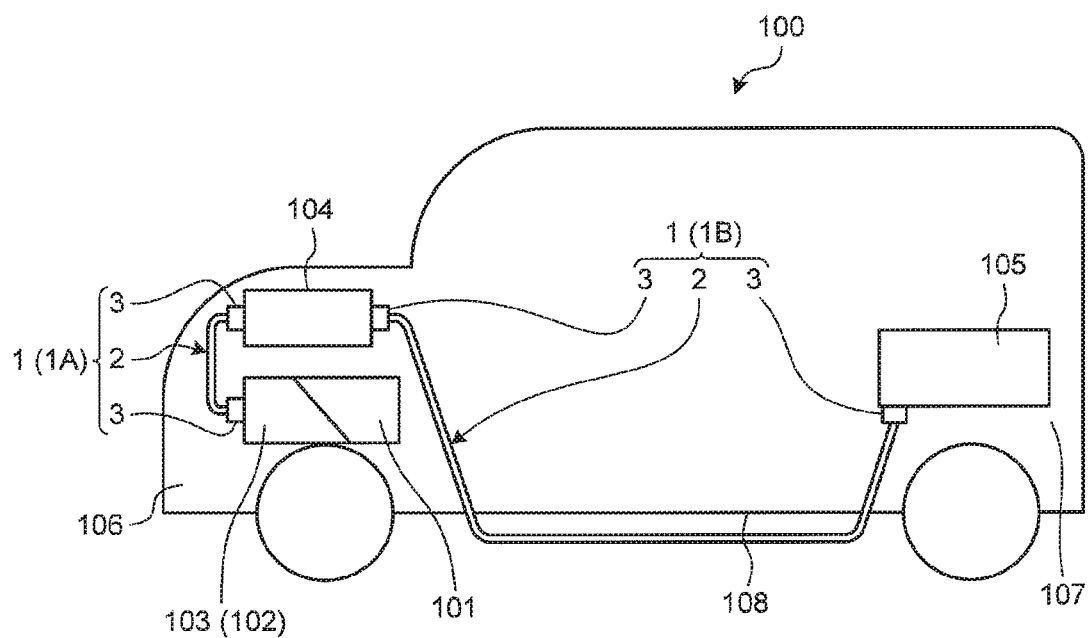
FIG. 1 is a schematic diagram illustrating an arrangement of a wire harness according to a first embodiment.
Figure 2:
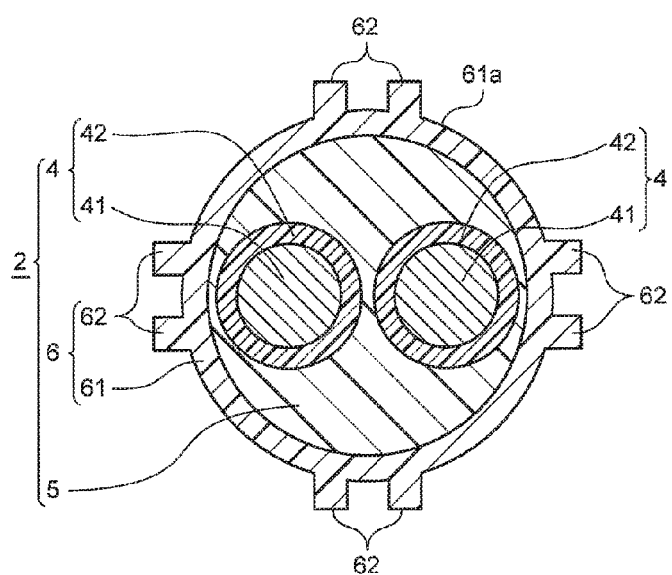
FIG. 2 is a schematic cross-sectional view illustrating an electric wire according to the first embodiment.
Figure 3:
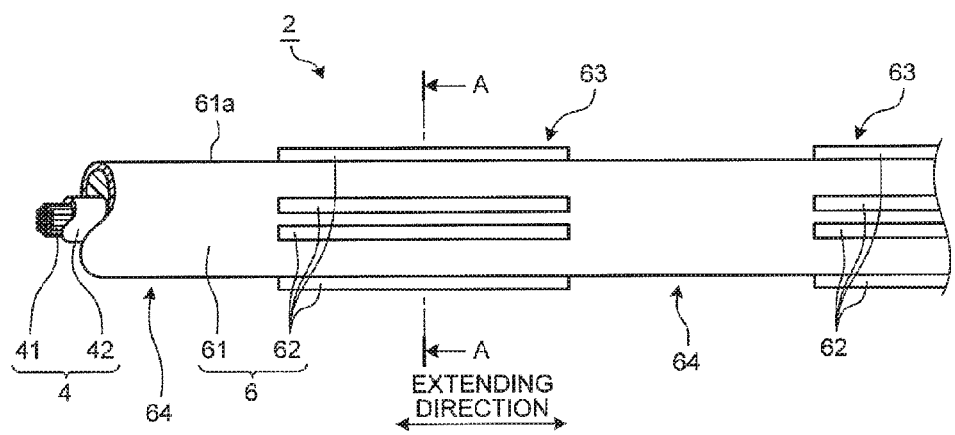
FIG. 3 is a schematic side view illustrating the electric wire according to the first embodiment.
Figure 4:
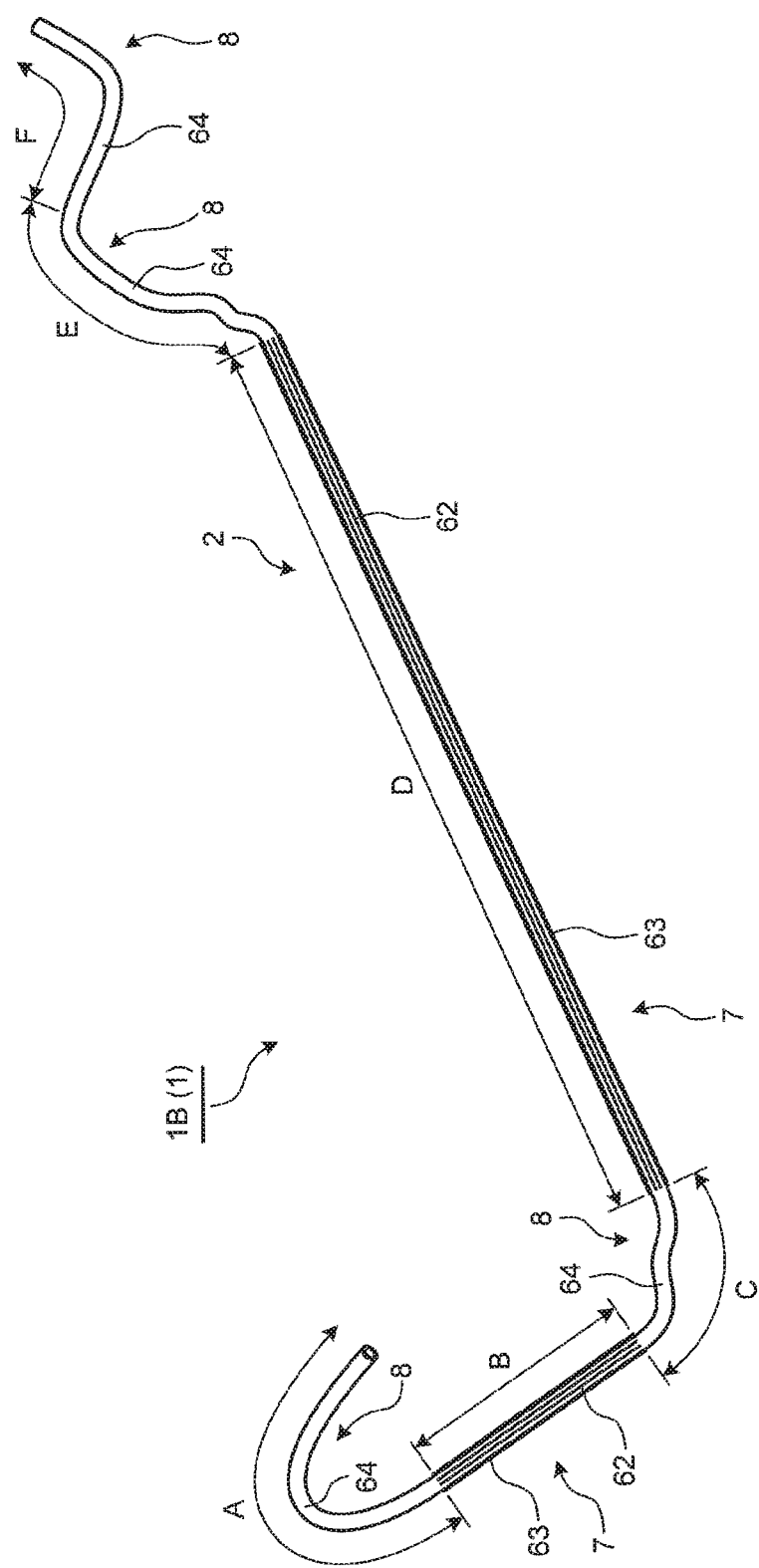
FIG. 4 is a schematic view for explaining a conductive path of the wire harness according to the first embodiment.

FIG. 1 is a schematic diagram illustrating an arrangement of a wire harness according to a first embodiment. FIG. 2 is a schematic cross-sectional view (cross-sectional view along A-A illustrated in FIG. 3) illustrating an electric wire according to the first embodiment. FIG. 3 is a schematic side view illustrating the electric wire according to the first embodiment. FIG. 4 is a schematic view for explaining a conductive path of the wire harness according to the first embodiment.

The wire harness 1 of the embodiment illustrated in FIG. 1 includes an electric wire 2, and a connector 3 as a connecting unit provided in both end portions of the electric wire 2. For example, in order to connect respective devices mounted on a vehicle 100, a plurality of the electric wires 2 used for power supply or signal communication is bundled to be a collective component, and the connector 3 connects the plurality of the electric wires 2 to the respective devices at one time. The wire harness 1 may be configured to further include a variety of constitutional components such as an electrical connection box (a junction box), a grommet, and a fixture. In the electric wire 2 of the embodiment and the wire harness 1 using the same, a covering main body 61 and a rib portion 62 are integrally formed in a covering member 6 which covers a conductor 41 as illustrated in FIG. 2 and the like, to improve workability during wiring arrangement.

First, the vehicle 100 to which the wire harness 1 of the embodiment is applied will be described with reference to FIG. 1. Here, a description will be given based on an assumption that the vehicle 100 is a hybrid vehicle (HV) including, as a power source for travelling, both of an engine 101 and a motor generator 102. The vehicle 100 is provided with the engine 101, a motor unit 103 including the motor generator 102, an inverter unit 104, and a battery (secondary battery) unit 105. Power is supplied to the motor unit 103 from the battery unit 105 through the inverter unit 104, thereby driving the motor generator 102. The vehicle 100 travels by a driving force generated by the engine 101 and/or the motor generator 102. In the vehicle 100 of the embodiment, the engine 101, the motor unit 103, and the inverter unit 104 are mounted in an engine compartment 106 on a vehicle front side, and the battery unit 105 is mounted in an accommodation unit 107 on a vehicle rear side. The wire harness 1 of the embodiment electrically connects respective devices which use relatively high voltage power in the vehicle 100, such as the motor unit 103 and the inverter unit 104, as well as the inverter unit 104 and the battery unit 105, and constitutes a high voltage system which supplies high voltage power between respective devices.

The wire harness 1 which connects the motor unit 103 and the inverter unit 104 (hereinafter, may be referred to as "wire harness 1A") is arranged in the engine compartment 106. One connector 3 of the wire harness 1A is connected to the motor unit 103, and another connector 3 thereof is connected to the inverter unit 104. An intermediate portion of the wire harness 1 which connects the inverter unit 104 and the battery unit 105 (hereinafter, may be referred to as "wire harness 1B") is arranged on a ground side of a vehicle underfloor portion 108, along the vehicle underfloor portion 108 substantially in parallel therewith. In the vehicle underfloor portion 108, through holes are formed in predetermined positions along a longitudinal direction of the vehicle body, and the wire harness 1B is inserted through the through holes. In the wire harness 1B, a connector 3 on a front side in the longitudinal direction of the vehicle body is connected to the inverter unit 104, and a connector 3 on a rear side in the longitudinal direction of the vehicle body is connected to a junction block or the like of the battery unit 105. In the following description, when it is not particularly necessary to describe the wire harness LA and the wire harness 1B distinctively from each other, the wire harness 1A and the wire harness 1B may be simply referred to as "wire harness 1."

The electric wire 2 which constitutes the wire harness 1 of the embodiment includes the conductor 41 and the covering member 6 as illustrated in FIGS. 2 and 3. The electric wire 2 of the embodiment is a cable wire such as a so-called cab tire cable in which a sheath (protective outer covering) is provided as the covering member 6 on an outer circumferential side of an insulated wire 4 (or twisted insulated wires 4) configured to include the conductor 41. The electric wire 2 is not limited to the cab tire cable, and may be other cable wire having a sheath as the covering member 6 such as a so-called coaxial cable.

Specifically, the electric wire 2 includes the insulated wire 4, an interposed substance 5, and the covering member 6. Here, the electric wire 2 is constituted by interposing the interposed substance 5 on the insulated wire 4 as an insulated wire core, or a plurality of the insulated wires 4 which have been twisted, to perform molding, and covering an outer circumferential surface thereof with the covering member 6. Here, the electric wire 2 is configured to included two insulated wires 4.

The insulated wire 4 is configured to include the linear conductor 41 and an insulator 42, and is formed by covering an outer circumferential side of the conductor 41 with the insulator 42. The conductor 41 is a conductive core wire and constituted by a conductive metal member. The conductor 41 is formed so as to be extended with substantially the same diameter in a direction the conductor 41 linearly extends (hereinafter may be referred to as "extending direction"). The conductor 41 is manufactured, for example, from copper, copper alloy, aluminum, or aluminum alloy. The conductor 41 may have a conductor structure obtained by twisting element wires, or a rod-like conductor structure having a rectangular or round cross section (for example, conductor structure of rectangular single core or round single core, and in that case, the electric wire itself has a rod-like shape). As the conductor 41, a plate-like conductor structure, such as a so-called bus bar, may be adopted. In a case of a twisted wire, the conductor 41 may be obtained by twisting wires about a core material (wire material used as a rigid body). The insulator 42 is a covering for an electric wire which covers the outer circumferential side of the conductor 41. The insulator 42 is provided to be in contact with an outer circumferential surface of the conductor 41. The insulator 42 is formed by extrusion molding of, for example, an insulated resin material (such as PP, PVC, and crosslinked PE, which is appropriately selected in view of abrasion resistance, chemical resistance, heat resistance and the like). The insulator 42 is formed on the conductor 41 from one end to another end thereof in an extending direction thereof. The insulator 42 is formed to a thickness with which minimum insulation properties against the conductor 41 are ensured. Here, the insulator 42 is formed such that the thickness from an inner circumferential surface to an outer circumferential surface thereof is substantially uniform, in other words, the thickness of the insulated wire 4 in a radial direction (thickness direction) thereof is substantially uniform. As an example, the insulated wire 4 includes the conductor 41 having a substantially round cross section (cross section in a direction intersecting with an extending direction thereof), and the insulator 42 having a substantially annular cross section (cross section in a direction intersecting with an extending direction thereof), and has a substantially round cross section as a whole.

The interposed substance 5 is interposed between each of the insulated wires 4 and the covering member 6. The interposed substance 5 may be configured to include any one of or all of, for example, a fixing member which fixes a plurality of insulated wires 4, a rod-like interposed member stacked on a plurality of insulated wires 4 to be bundled together, a plurality of insulated wires 4 superimposed each other, a wrapping tape wound around the outer circumference of the fixing member, the interposed member or the like. The interposed substance 5 may be configured to include, for example, a shielding member provided between each of the insulated wires 4 and the covering member 6.

The covering member 6 is a covering for an electric wire which covers the outer circumferential side of the conductor 41. The covering member 6 of the embodiment is a sheath which covers the outer circumferential side of the insulated wire 4 obtained by covering the conductor 41 with the insulator 42, as described above. The covering member 6 is provided to be in contact with an outer circumferential surface of the interposed substance 5, at an outermost position of the electric wire 2. The covering member 6 is formed by extrusion molding of, for example, an insulated resin material (such as PP, PVC, and crosslinked PE, which is appropriately selected in view of abrasion resistance, chemical resistance, heat resistance and the like).

The covering member 6 of the embodiment is configured to include the conductor 41, here, the covering main body 61 which covers the outer circumferential side of the insulated wire 4, and the rib portion 62 which is formed integrally with the covering main body 61, as a protrusion, on an outer circumferential surface 61a of the covering main body 61. The covering member 6 is formed by integrally performing extrusion molding of the covering main body 61 and the rib portion 62.

The covering main body 61 is a portion serving as a base of the covering member 6, and is formed on the conductor 41 from one end to another end thereof in the extending direction thereof. The covering main body 61 is formed to a predetermined thickness on the outer circumferential surface of the interposed substance 5. The covering main body 61 is formed such that the thickness from an inner circumferential surface to the outer circumferential surface 61a is substantially uniform, in other words, the thickness of the electric wire 2 in a radial direction (thickness direction) thereof is substantially uniform. The covering main body 61 has a substantially annular cross section (cross section in a direction intersecting with an extending direction). The covering main body 61 is formed to have predetermined flexibility.

The rib portion 62 is formed to protrude outward from the outer circumferential surface 61a of the covering main body 61 integrally with the covering main body 61. The rib portion 62 functions as a reinforcing portion which reinforces the covering main body 61 and improves the rigidity thereof.

In the covering member 6 of the embodiment, the rib portion 62 is provided in accordance with the intended use, required performance and the like of each site of the electric wire 2, and concavity and convexity are formed on the outer circumferential surface 61a of the covering main body 61 by the rib portion 62. Consequently, a balance between appropriate flexibility and rigidity, which is required in accordance with each site, is achieved in one electric wire 2.

If the rib portion 62 of the covering member 6 is formed to be relatively dense (increased in density), the rigidity of the site can be increased. Consequently, for example, linearity retaining properties and durability of the site in the electric wire 2 can be improved. On the other hand, if the rib portion 62 of the covering member 6 is formed to be relatively less dense (decreased in density), the rigidity of the site can be decreased. Consequently, for example, the flexibility of the site of the electric wire 2 can be maintained, and favorable bendability can be maintained. As a result, it is possible to maintain the flexibility of the site in need thereof, and to improve the rigidity in accordance with a demand, in one electric wire 2.

Specifically, as an example, the covering member 6 illustrated in FIGS. 2 and 3 is formed so as to include sites having different density of the rib portion 62 from each other in an extending direction of the conductor 41 (insulated wire 4). The covering member 6 in FIGS. 2 and 3 is configured to include a straight portion 63 and a bent portion 64 in the extending direction of the conductor 41. The straight portion 63 is a site including relatively many rib portions 62, which means a dense site, and the bent portion 64 is a site including relatively few rib portions 62, which means a less dense site.

In the example illustrated in FIGS. 2 and 3, the rib portion 62 is formed in the straight portion 63 along the extending direction of the conductor 41. In the straight portion 63, a plurality of the rib portions 62, here, eight in total, is provided along the circumferential direction of the outer circumferential surface 61a of the covering main body 61. Here, the eight rib portions 62 are provided in pairs in four positions, which are point-symmetric positions in a cross section in a direction intersecting with the extending direction (see FIG. 2). Each rib portion 62 is formed to have a substantially rectangular cross section (cross section in a direction intersecting with the extending direction). As a result, it is possible to increase the rigidity of the straight portion 63 of the electric wire 2, and thereby, for example, linearity retaining properties and durability of the site can be improved.

The configuration of the rib portion 62 is not limited to the above configuration. The rib portion 62 may be formed along the circumferential direction of the covering main body 61, or may be formed to be inclined with respect to the extending direction and the circumferential direction thereof. In addition, the plurality of the rib portions 62 may be provided at equal spaces along the circumferential direction. Furthermore, each rib portion 62 may be formed to have a cross section (cross section in a direction intersecting with the extending direction) of which a protruding tip side has a curved surface. In order to further increase the rigidity of the straight portion 63, a larger number of the rib portions 62 may be provided. In other words, the cross section shape, the degree of protrusion, the number, the position, and the like of the rib portion 62 may be appropriately changed.

On the other hand, the bent portion 64 is provided beside the straight portion 63 along the extending direction of the conductor 41. In the bent portion 64, the rib portion 62 is less dense than that in the straight portion 63. The bent portion 64 of the embodiment is formed as a site which does not include the rib portion 62. The bent portion 64 is formed to be adjacent to the straight portion 63 along the extending direction of the conductor 41. As a result, it is possible to decrease the rigidity of the bent portion 64 of the electric wire 2, and thereby, for example, the flexibility of the site can be maintained, and favorable bendability can be maintained.

In other words, in the electric wire 2, the rib portion 62 is formed at intervals with respect to the extending direction, depending on whether the site is the straight portion 63 or the bent portion 64. Consequently, it is possible to configure the electric wire 2 such that the linear shape thereof is retained by the straight portion 63 and the flexibility is demonstrated by the bent portion 64.

Regarding the covering member 6, in a case where the covering main body 61 and the rib portion 62 are integrally formed while making a distinction between the straight portion 63 and the bent portion 64, the straight portion 63 and the bent portion 64 may be formed, for example, by simultaneously molding the rib portion 62 at the time of extrusion molding, and then removing an unnecessary part of the rib portion 62. In addition, regarding the covering member 6, the straight portion 63 and the bent portion 64 may be formed, for example, by performing extrusion molding in consideration of, besides the thickness of the covering main body 61, the degree of protrusion of the rib portion 62, and then molding concavity and convexity by pressing a resin with a mold while the resin is soft so that the rib portion 62 is molded in places in need thereof.

When the electric wire 2 thus configured is applied to the wire harness 1, as illustrated in FIG. 4, the straight portion 63 constitutes a linear conductive path 7, and the bent portion 64 constitutes a bent conductive path 8. In the example in FIG. 4, the wire harness 1B is illustrated. Sections B and D are the linear conductive paths 7, and sections A, C, E, and F are the bent conductive paths 8. In the wire harness 1B, the straight portion 63 of the covering member 6 is positioned in the sections B and D, and thereby linearity retaining properties can be imparted to the linear conductive paths 7. As a result, the sections B and D can function as a route regulation section which regulates deformation of the electric wire 2 when arranging the wire harness 1B to the vehicle 100, and the like. On the other hand, in the wire harness 1B, the bent portion 64 of the covering member 6 is positioned in the sections A, C, E, and F, and thereby favorable bendability can be imparted to the bent conductive paths 8. As a result, the sections A, C, E, and F can function as a deformation accepting section which accepts deformation of the electric wire 2 when arranging the wire harness 1B to the vehicle 100, and the like.

In other words, regarding the electric wire 2, a larger number of the rib portions 62 are integrally formed with the covering main body 61 located at the sites which will be sections B and D when the wire harness 1B is arranged in the vehicle 100, and thereby the straight portion 63 is formed.

On the other hand, the rib portion 62 is not provided in the covering main body 61 located at the sites which will be sections A, C, E, and F, and thereby the bent portion 64 is formed. As a result, the wire harness 1B can be configured to include, as a route regulation section, the sections B and D which constitute the linear conductive paths 7, and as a deformation accepting section, the sections A, C, E, and F which constitute the bent conductive paths 8, as described above.

The section D which constitutes the linear conductive path 7 corresponds to the above-described intermediate portion. In other words, the section D corresponds to a section arranged on the ground side of the vehicle underfloor portion 108. Therefore, by providing, in the wire harness 1B, a larger number of the rib portions 62 in a site in the straight portion 63 of the covering member 6, which site constitutes the section D and is positioned on a lower side in a vertical direction when it is arranged in the vehicle 100, it is possible to increase, for example, durability (chipping resistance) to flying stones while the vehicle 100 is travelling, and durability to a curbstone when the vehicle 100 runs upon the curbstone. In other words, the covering member 6 may be configured to include sites having different density of the rib portion 62 from each other in the circumferential direction of the covering main body 61. By such a configuration, it is possible to locally increase durability of the electric wire 2 in the circumferential direction.

The above-described electric wire 2 includes the linear conductor 41 and the covering member 6. The covering member 6 is configured to include the covering main body 61 which covers the outer circumferential side of the conductor 41, and the rib portion 62 which is formed integrally with the covering main body 61, as a protrusion, on the outer circumferential surface 61a of the covering main body 61. The above-described wire harness 1 includes the electric wire 2 and the connector 3 provided in both end portions of the electric wire 2. Here, the covering member 6 is a sheath which covers the outer circumferential side of the insulated wire 4 obtained by covering the conductor 41 with the insulator 42. Therefore, with the electric wire 2 and the wire harness 1, it is possible to ensure predetermined rigidity by the rib portion 62 integrally formed with the covering main body 61 and to regulate a route without using a packaging member such as a corrugated tube or a protector. Therefore, it is possible to improve workability during wiring arrangement.

More specifically, the electric wire 2 and the wire harness 1 includes the straight portion 63 and the bent portion 64 as sites having different density of the rib portion 62 from each other in the extending direction of the conductor 41. The straight portion 63 constitutes the linear conductive path 7 and the bent portion 64 constitutes the bent conductive path 8. Consequently, with the electric wire 2 and the wire harness 1, a variety of work such as packing, transport and wiring arrangement can be performed while ensuring the rigidity and regulating the route by the straight portion 63, and maintaining the flexibility and allowing the bend by the bent portion 64. As a result, with the electric wire 2 and the wire harness 1, the entire wire harness 1 can be easily arranged in the vehicle 100 and fixed with a fixing tool such as a clip, without using a packaging member and the like, while maintaining a predetermined shape of the wire harness 1 and ensuring mobility in a predetermined range. Therefore, it is possible to improve workability during wiring arrangement.

In addition, regarding the electric wire 2 and the wire harness 1, it is possible to improve durability of a site for which durability is required as described above by adjusting the density of the rib portion 62 to be relatively high. In that case, regarding the electric wire 2 and the wire harness 1, it is possible to eliminate a harness cover generally used for protecting the wire harness 1 when, for example, sufficient durability can be ensured by the rib portion 62.

With the electric wire 2 and the wire harness 1, it is possible to improve workability during wiring arrangement and to improve durability without using a packaging member and the like. Therefore, the number of constitutional components can be reduced, and thereby reduction in weight, size, cost, man hours and the like can be realized.

Second Embodiment

Figure 5:
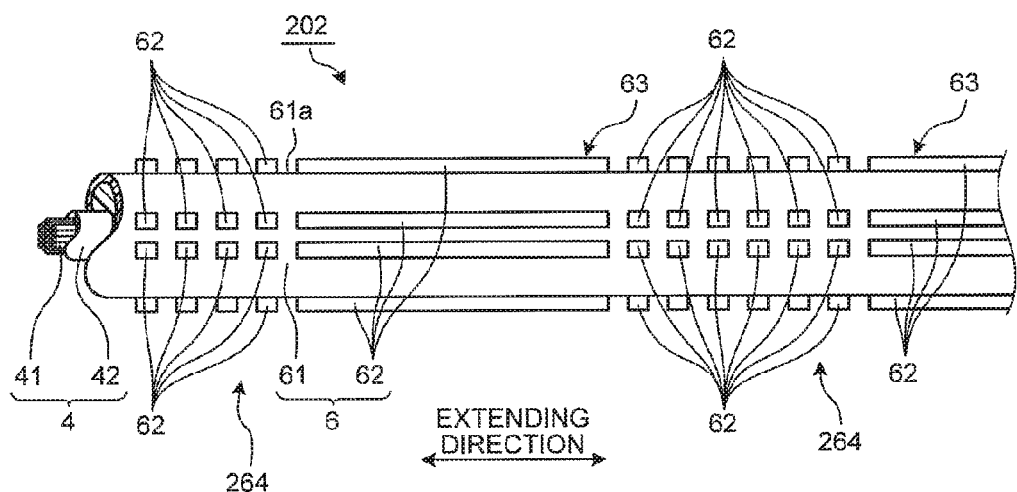
FIG. 5 is a schematic side view illustrating an electric wire according to a second embodiment.

FIG. 5 is a schematic side view illustrating an electric wire according to a second embodiment. The electric wire and a wire harness according to the second embodiment are different from those according to the first embodiment in that the rib portion is included also in the bent portion. With regard to the configuration, the action, and the effect in common with those in the above-described embodiment, an overlapped description will be omitted as much as possible, and FIGS. 1 to 4 are appropriately referred to (the same holds for an embodiment and a variation described later).

An electric wire 202 of the embodiment illustrated in FIG. 5 is, as with the above-described case, applied to a wire harness 1 (wire harnesses 1A and 1B). A plurality of relatively short rib portions 62 (rib portions 62 shorter than at least a rib portion 62 of a straight portion 63) is provided in a bent portion 264 of the electric wire 202. In other words, although the above-described bent portion 64 has been described based on the assumption that the bent portion 64 is formed as a site which is not provided with the rib portion 62, there is no limitation thereto. The bent portion 264 of the electric wire 202 may include the rib portion 62 to the extent that favorable bendability can be maintained, and in that case, the rib portion 62 may be included in the bent portion 264 as long as the rib portion 62 is less dense than that in the straight portion 63. By the above configuration, with regard to the electric wire 202 and the wire harness 1, for example, it is possible to maintain the flexibility of the site and to maintain favorable bendability thereof, and in addition, to improve durability. Therefore, it is possible to improve workability during wiring arrangement, and to increase durability such as chipping resistance.

Third Embodiment

Figure 6:
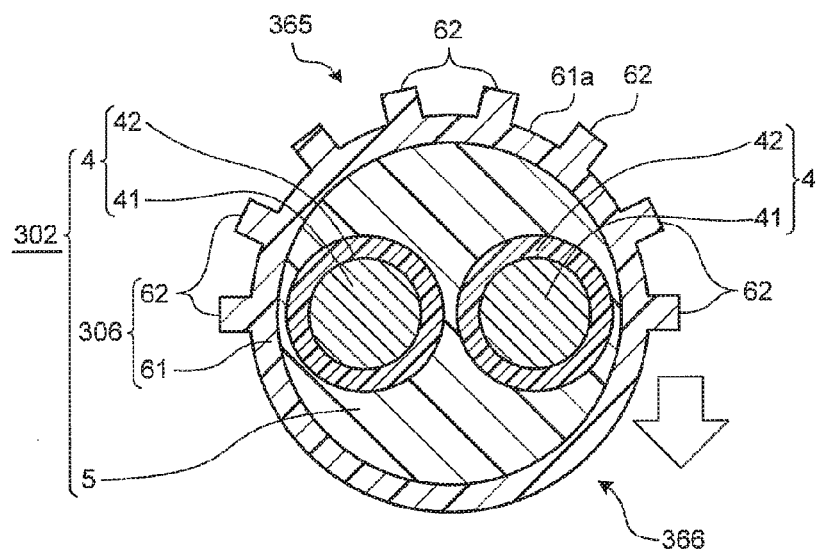
FIG. 6 is a schematic cross-sectional view illustrating an electric wire according to a third embodiment.

FIG. 6 is a schematic cross-sectional view illustrating an electric wire according to a third embodiment. The electric wire and a wire harness according to the third embodiment are different from those according to the first and second embodiments in that the covering member includes a bent outer part, which is an outer part of a bend, and a bent inner part, which is an inner part of a bend.

An electric wire 302 of the embodiment illustrated in FIG. 6 is, as with the above-described case, applied to a wire harness 1 (wire harnesses 1A and 1B). A covering member 306 of the electric wire 302 of the embodiment illustrated in FIG. 6 is formed to include sites having different density of a rib portion 62 from each other in the circumferential direction of the covering main body 61. The covering member 306 is configured to include a bent outer part 365 and a bent inner part 366 in a circumferential direction of the covering main body 61. The bent outer part 365 is included as a site with relatively many rib portions 62, which means a dense site, and the bent inner part 366 is included as a site with relatively few rib portions 62, which means a less dense site.

The rib portion 62 is formed in the bent outer part 365. In the bent outer part 365, a plurality of the rib portions 62 is provided on an outer circumferential surface 61a at a semicircular arc-shaped site located on one side in a radial direction of the covering main body 61 (electric wire 302), in a cross-sectional view in a direction intersecting with the extending direction as illustrated in FIG. 6. The plurality of the rib portions 62 is integrally molded with the covering main body 61. Here, eight rib portions 62 are provided at equal spaces along the circumferential direction of the outer circumferential surface 61a of the covering main body 61. Each of the rib portions 62 has substantially the same configuration as that of the rib portion 62 described above, and for example, the rib portion 62 is formed along the extending direction of a conductor 41.

On the other hand, the bent inner part 366 is provided beside the bent outer part 365 along the circumferential direction of the covering main body 61. In the bent inner part 366, the rib portion 62 is less dense than that in the bent outer part 365. The bent inner part 366 of the embodiment is formed as a site which is not provided with the rib portion 62 at a semicircular arc-shaped site located on another side in the radial direction of the covering main body 61 (electric wire 302), in a cross-sectional view in a direction intersecting with the extending direction as illustrated in FIG. 6. The bent inner part 366 is formed to be adjacent to the bent outer part 365 along the circumferential direction of the covering main body 61.

The description has been given based on the assumption that the rib portions 62 of the bent outer part 365 are disposed at equal spaces along the circumferential direction. However, there is no limitation thereto, and the spaces between the adjacent rib portions 62 in the circumferential direction may be different from each other. As with the case of the bent portion 264 of the electric wire 202 described with reference to the FIG. 5, the bent inner part 366 may include the rib portion 62 to the extent that favorable bendability can be maintained, and in that case, the rib portion 62 may be included in the bent inner part 366 as long as the rib portion 62 is less dense than that in the bent outer part 365. Typically, the bent outer part 365 and the bent inner part 366 constitute the above-described bent portion 64.

Figure 7:
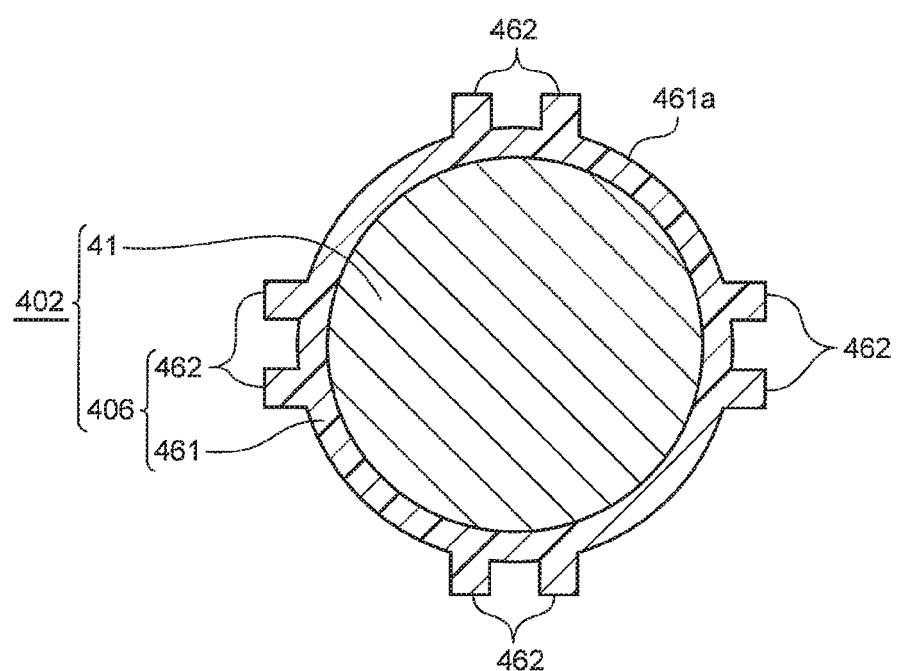
FIG. 7 is a schematic cross-sectional view illustrating an electric wire according to a fourth embodiment.

Regarding the electric wire 302 as configured above and the wire harness 1 using the same, the density of the rib portion 62 can be varied between the bent outer part 365 and the bent inner part 366 in the circumferential direction of the covering main body 61. Accordingly, in the circumferential direction, the rigidity can be increased in the bent outer part 365, while the flexibility can be maintained in the bent inner part 366. As a result, the electric wire 302 and the wire harness 1 can be configured to be hard to bend toward the bent outer part 365 side so as to maintain the shape, and to be easy to bend toward the bent inner part 366. In other words, a desired direction of bending can be limited. In other words, regarding the electric wire 302 and the wire harness 1, the rigidity against bending can be varied depending on the circumferential direction of the covering main body 61 (electric wire 302). For example, the electric wire 302 and the wire harness 1 can be configured to be easy to bend toward a desired direction, and to be hard to bend toward other direction, which means that bending directivity can be imparted thereto. Therefore, it is possible to further improve workability during wiring arrangement.

Fourth Embodiment FIG. 7 is a schematic cross-sectional view illustrating an electric wire according to a fourth embodiment. The electric wire and a wire harness according to the fourth embodiment are different from those according to the first to the third embodiments in that the electric wire includes an insulated wire.

An electric wire 402 of the embodiment illustrated in FIG. 7 is, as with the above-described case, applied to a wire harness 1 (wire harnesses 1A and 1B). Although the above-described electric wire 2 has been described based on the assumption that the electric wire 2 is a cable wire such as a cab tire cable and a coaxial cable, there is no limitation thereto. The electric wire 402 of the embodiment is an insulated wire itself which includes a conductor 41 and a covering member 406, and in which an insulator as the covering member 406 is provided on the outer circumferential side of the conductor 41. The electric wire 402 has substantially the same configuration as that of the above-described insulated wire 4 (see FIG. 2, and the like) except that a rib portion 462 is formed on the insulator as the covering member 406. The electric wire 402 may be an insulated wire such as a shielded wire. In that case, the covering member 406 is a covering for an electric wire which covers the outer circumferential side of the conductor 41. The covering member 406 of the embodiment is an insulator which covers the outer circumferential side of the conductor 41, and has substantially the same configuration as that of the above-described insulator 42 (see FIG. 2, and the like) except that the rib portion 462 is formed thereon. The covering member 406 is configured to include a covering main body 461 and the rib portion 462. The covering main body 461 covers the outer circumferential side of the conductor 41. The rib portion 462 is formed integrally with the covering main body 461, as a protrusion, on an outer circumferential surface 461a of the covering main body 461. The covering member 406 is formed by integrally performing extrusion molding of the covering main body 461 and the rib portion 462. The configuration of the rib portion 462 is substantially the same as that of the above-described rib portion 62. Even in that case, as with the above case, the electric wire 402 and the wire harness 1 make it possible to ensure predetermined rigidity by the rib portion 462 integrally formed with the covering main body 461 and to regulate a route without using a packaging member such as a corrugated tube or a protector. Therefore, it is possible to improve workability during wiring arrangement.

The electric wires and the wire harnesses according to the embodiments of the present invention described above are not limited to those of the embodiments described above, and various modifications may be made without departing from the scope described in claims. The electric wire and the wire harness according to the embodiment may be configured by appropriately combine constitutional elements of each of the embodiments described above and variations.

Although the electric wire and the wire harness described above have been described based on the assumption that the electric wire and the wire harness are applied to an HV vehicle, there is no limitation thereto. The electric wire and the wire harness may be applied to an electric vehicle (EV) which includes, as a power source for travelling, a motor generator 102 and does not include an engine 101. In addition, the electric wire and the wire harness described above may be applied to a conventional vehicle which includes the engine 101 and does not include the motor generator 102, and may be applied to either type of vehicles. Furthermore, although the description has been given based on the assumption that the connector 3 is used as a connecting unit of the wire harness, there is no limitation thereto. The connecting unit may be a terminal provided in an end portion of the electric wire by crimping, welding, or the like.

In the above description, the electric wires 2, 202, and 302 have been described based on the assumption that the electric wires are configured to include the interposed substance 5. However, there is no limitation thereto. The electric wires 2, 202, and 302 may have, for example, a configuration in which the interposed substance 5 is not included, and the covering main body 61 of the covering members (sheath) 6 and 306 directly covers the outer circumferential side of the insulated wire 4 without interposing the interposed substance 5. In that case, a portion corresponding to the interposed substance 5 also may be constituted by the covering main body 61.

With the electric wire and the wire harness according to the present invention, it is possible to ensure predetermined rigidity by a rib portion integrally formed with a covering main body and to regulate a route without using a packaging member such as a corrugated tube or a protector. Therefore, an effect of improving workability during wiring arrangement is exerted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire comprising:
a linear conductor; and
a covering member configured to include a covering main body that covers an outer circumferential side of the conductor, and a rib portion that is formed integrally with the covering main body, as a protrusion, on an outer circumferential surface of the covering main body, wherein
the covering member includes a straight portion in which the rib portion is formed along an extending direction of the conductor, and a bent portion that is provided beside the straight portion along the extending direction of the conductor and in which the rib portion is less dense than that in the straight portion, and
the bent portion is provided with the rib portion.

2. An electric wire comprising:
a linear conductor; and
a covering member configured to include a covering main body that covers an outer circumferential side of the conductor, and a rib portion that is formed integrally with the covering main body, as a protrusion, on an outer circumferential surface of the covering main body, wherein
the covering member includes a bent outer part in which the rib portion is formed and a bent inner part that is provided beside the bent outer part along a circumferential direction of the covering main body and in which the rib portion is less dense than that in the bent outer part.

3. The electric wire according to claim 1, wherein
the covering member includes sites having different density of the rib portion from each other in the extending direction of the conductor.

4. The electric wire according to claim 2, wherein
the covering member includes sites having different density of the rib portion from each other in the extending direction of the conductor.

5. The electric wire according to claim 1, wherein the covering member includes sites having different density of the rib portion from each other in a circumferential direction of the covering main body.

6. The electric wire according to claim 2, wherein
the covering member includes sites having different density of the rib portion from each other in the circumferential direction of the covering main body.

7. The electric wire according to claim 3, wherein
the covering member includes sites having different density of the rib portion from each other in the circumferential direction of the covering main body.

8. The electric wire according to claim 1, wherein
the covering member is a sheath that covers an outer circumferential side of an insulated wire obtained by covering the conductor with an insulator.

9. The electric wire according to claim 2, wherein
the covering member is a sheath that covers an outer circumferential side of an insulated wire obtained by covering the conductor with an insulator.

10. The electric wire according to claim 3, wherein
the covering member is a sheath that covers an outer circumferential side of an insulated wire obtained by covering the conductor with an insulator.

11. The electric wire according to claim 4, wherein
the covering member is a sheath that covers an outer circumferential side of an insulated wire obtained by covering the conductor with an insulator.

12. The electric wire according to claim 1, wherein
the covering member is an insulator that covers the outer circumferential side of the conductor.

13. The electric wire according to claim 2, wherein
the covering member is an insulator that covers the outer circumferential side of the conductor.

14. The electric wire according to claim 3, wherein
the covering member is an insulator that covers the outer circumferential side of the conductor.

15. The electric wire according to claim 4, wherein
the covering member is an insulator that covers the outer circumferential side of the conductor.

16. A wire harness comprising:
an electric wire that includes a linear conductor, and a covering member configured to include a covering main body that covers an outer circumferential side of the conductor, and a rib portion that is formed integrally with the covering main body, as a protrusion, on an outer circumferential surface of the covering main body; and
a connecting unit provided at an end portion of the electric wire, wherein
the covering member includes a straight portion in which the rib portion is formed along an extending direction of the conductor, and a bent portion that is provided beside the straight portion along the extending direction of the conductor and in which the rib portion is less dense than that in the straight portion,
the straight portion constitutes a linear conductive path, and
the bent portion constitutes a bent conductive path provided with the rib portion.

17. A wire harness comprising:
an electric wire that includes a linear conductor, and a covering member configured to include a covering main body that covers an outer circumferential side of the conductor, and a rib portion that is formed integrally with the covering main body, as a protrusion, on an outer circumferential surface of the covering main body; and
a connecting unit provided at an end portion of the electric wire, wherein
the covering member includes a bent outer part in which the rib portion is formed and a bent inner part that is provided beside the bent outer part along a circumferential direction of the covering main body and in which the rib portion is less dense than that in the bent outer part.

* * * * *